US012403912B2

(12) United States Patent
Gruber et al.

(10) Patent No.: US 12,403,912 B2
(45) Date of Patent: Sep. 2, 2025

(54) METHOD OF ATTENUATING LONGITUDINAL ACCELERATION OSCILLATIONS OF A VEHICLE BODY

(71) Applicant: Advanced Suspension Technology LLC, Northville, MI (US)

(72) Inventors: Patrick Gruber, Guildford (GB); Victor Vidal Munoz, Guildford (GB); Pietro Stano, Guildford (GB); Davide Tavernini, Guildford (GB); Aldo Sorniotti, Guildford (GB); Miguel Dhaens, Lommel (BE)

(73) Assignee: Advanced Suspension Technology LLC, Northville, MI (US)

( * ) Notice: Subject to any disclaimer, the term of this patent is extended or adjusted under 35 U.S.C. 154(b) by 115 days.

(21) Appl. No.: 18/279,125

(22) PCT Filed: Mar. 7, 2022

(86) PCT No.: PCT/US2022/019096
§ 371 (c)(1),
(2) Date: Aug. 28, 2023

(87) PCT Pub. No.: WO2022/192115
PCT Pub. Date: Sep. 15, 2022

(65) Prior Publication Data
US 2024/0182037 A1 Jun. 6, 2024

Related U.S. Application Data

(60) Provisional application No. 63/158,136, filed on Mar. 8, 2021.

(51) Int. Cl.
*B60W 30/20* (2006.01)
*B60G 17/0165* (2006.01)
(Continued)

(52) U.S. Cl.
CPC ........ *B60W 30/20* (2013.01); *B60G 17/0165* (2013.01); *B60G 17/0195* (2013.01);
(Continued)

(58) Field of Classification Search
None
See application file for complete search history.

(56) References Cited

U.S. PATENT DOCUMENTS 9,434,229 B2     9/2016  Hilton
9,527,510 B2 *  12/2016  Katsuyama ........... B60W 30/18
(Continued)

FOREIGN PATENT DOCUMENTS

KR     1019990002083 A      1/1999

OTHER PUBLICATIONS

Parra et al., "On Nonlinear Model Predictive Control for Energy-Efficient Torque-Vectoring," IEEE Transactions on Vehicular Technology, vol. 70, No. 1, Jan. 2021, pp. 173-188. (Year: 2021).*
(Continued)

*Primary Examiner* — Todd Melton
(74) *Attorney, Agent, or Firm* — Harness, Dickey & Pierce, P.L.C.

(57) ABSTRACT

An oscillation control system of a vehicle includes a distribution control module configured to determine: a first front torque request for one or more front electric motors of the vehicle; and a first rear torque request for one or more rear electric motors of the vehicle; a first control module configured to: determine a second front torque request for the front electric motor(s) of the vehicle based on the first front torque request and a front wheel road profile; and control power flow to the front electric motor(s) based on the second front torque request; a second control module configured to: determine a second rear torque request for the rear electric motor(s) of the vehicle based on the first rear torque request
(Continued)

and a rear wheel road profile; and control power flow to the rear electric motor(s) based on the second rear torque request.

20 Claims, 7 Drawing Sheets

(51) Int. Cl.
    *B60G 17/0195*     (2006.01)
    *B60K 23/08*     (2006.01)
    *B60L 15/20*     (2006.01)
    *B60W 10/08*     (2006.01)
    *B60W 10/22*     (2006.01)

(52) U.S. Cl.
    CPC .......... *B60K 23/0808* (2013.01); *B60L 15/20* (2013.01); *B60W 10/08* (2013.01); *B60W 10/22* (2013.01); *B60G 2200/466* (2013.01); *B60G 2300/50* (2013.01); *B60G 2400/32* (2013.01); *B60G 2400/821* (2013.01); *B60G 2600/1873* (2013.01); *B60K 2023/0816* (2013.01); *B60L 2240/463* (2013.01); *B60W 2552/35* (2020.02); *B60W 2710/083* (2013.01); *B60W 2710/22* (2013.01)

(56) References Cited

U.S. PATENT DOCUMENTS

| | | |
|---|---|---|
| 2017/0036669 A1 | 2/2017 | Kanou et al. |
| 2019/0077258 A1 | 3/2019 | Cho |
| 2020/0398844 A1 | 12/2020 | Ruybal et al. |
| 2021/0053409 A1 | 2/2021 | Kim |
| 2022/0371590 A1* | 11/2022 | Busse ................ B60G 17/0195 |

OTHER PUBLICATIONS

International Search Report and Written Opinion of the ISA issued in PCT/US2022/019096, mailed Jun. 14, 2022; ISA/KR.
I. Bakirci, N. Katadzic, "The use of wheel torque modulation to mitigate road induced longitudinal vibrations," M.S. thesis, Dept. of Applied Mechanics, Chalmers University Of Technology, 2014, Göteborg, Sweden.
H. Fukudome, "Reduction of Longitudinal Vehicle Vibration Using In-Wheel Motors," SAE Technical Paper, 2016.
S. Yamada, T. Beauduin, H. Fujimoto, T. Kanou, E. Katsuyama, "Model-based longitudinal vibration suppression control for electric vehicles with geared in-wheel motors," 2017 IEEE International Conference on Advanced Intelligent Mechatronics (AIM), 2017, Munich, Germany.
T. Beauduin, S. Yamada, H. Fujimoto, T. Kanou and E. Katsuyama, "Control-oriented modelling and experimental modal analysis of Electric Vehicles with geared In-Wheel Motors," 2017 IEEE International Conference on Advanced Intelligent Mechatronics (AIM), 2017, Munich, Germany.
F. Walz, S. Hohmann, "On model-based longitudinal feed-forward motion control for low velocities on known road profiles," Vehicle System Dynamics, 2019.
F. Walz, S. Hohmann, "Model predictive longitudinal motion control for low velocities on known road profiles," Vehicle System Dynamics, 2020.
Z. Guo, W. Wu, S. Yuan, "Longitudinal-vertical dynamics of wheeled vehicle under off-road conditions," Vehicle System Dynamics, 2020.
A.J.C. Schmeitz, S.T.H. Jansen, H.B. Pacejka, J.C. Davis, N.N. Kota, C.G. Liang, G. Lodewijks, "Application of a semi-empirical dynamic tyre model for rolling over arbitrary road profiles," International Journal of Vehicle Design, 2004.

* cited by examiner

_US 12,403,912 B2_

METHOD OF ATTENUATING LONGITUDINAL ACCELERATION OSCILLATIONS OF A VEHICLE BODY

CROSS-REFERENCE TO RELATED APPLICATIONS

This application is a U.S. National Phase Application under 35 U.S.C. 371 of International Application No. PCT/US2022/019096, filed on Mar. 7, 2022, which claims the benefit of U.S. Provisional Application No. 63/158,136, filed on Mar. 8, 2021. The entire disclosure of the provisional application referenced above is incorporated herein by reference.

FIELD

The present disclosure relates to powertrains of vehicles and more particularly to on-board or in-wheel electric powertrains.

BACKGROUND

Powertrain based controllers can be used for the compensation of the longitudinal acceleration oscillations induced by road irregularities. However, such controllers may be based either on: a) simple feedback controllers, which may be significantly penalized by the high dynamics of typical road excitations and the relatively slow powertrain dynamics; or b) basic feedforward formulations, which may be effective at low speed, and may not formally account for the road profile ahead. For example, a proportional integral (PI) controller for mitigating the longitudinal vibrations in an internal-combustion-engine-driven vehicle may be used. Experimental results may reveal the limitation of the internal combustion engine in terms of time response to produce the necessary torque variations. A simple feedback controller may be used based on the relative longitudinal speed between the sprung and unsprung masses—to reduce the longitudinal road-induced vibrations. A selected test vehicle may have in-wheel motors on the rear axle.

An algorithm based on the combination of feedback and feedforward contributions may be used and a simplified model in which the feedback contribution includes a dead-time compensator observer may provide robustness against communication delays. A control system may be used for automated vehicles, with a two-point tire model and a feedforward control law assuming a known road profile in the form of a single point ahead, to reduce the longitudinal acceleration response while overcoming obstacles at very low speeds. A linear model predictive controller may control actuation of the engine and brakes. However, the model predictive control formulation may not include consideration of road preview information.

Modeling principles of the longitudinal and vertical dynamics of a vehicle on an irregular surface may include a tire enveloping model (e.g., a model to consider the effect of tire deflection in its contact patch area). Suspension control for drivability enhancement with in-wheel motors may be used.

There is a need for the development of advanced controllers (control modules) using information on a road profile ahead of a vehicle and torque modulation allowed by the electric powertrains to attenuate the longitudinal vibrations produced by road irregularities. Such controllers may be referred to as road-preview-augmented controllers.

SUMMARY

In a feature, an oscillation control system of a vehicle includes a distribution control module configured to determine: a first front torque request for one or more front electric motors of the vehicle; and a first rear torque request for one or more rear electric motors of the vehicle; a first control module configured to: determine a second front torque request for the one or more front electric motors of the vehicle based on the first front torque request and a front wheel road profile; and control power flow to the one or more front electric motors based on the second front torque request; a second control module configured to: determine a second rear torque request for the one or more rear electric motors of the vehicle based on the first rear torque request and a rear wheel road profile; and control power flow to the one or more rear electric motors based on the second rear torque request.

In further features, the first control module is configured to determine the second front torque request for the one or more front electric motors using model predictive control.

In further features, the first control module is configured to determine the second front torque request for the one or more front electric motors using non-linear model predictive control.

In further features, the second control module is configured to determine the second rear torque request for the one or more rear electric motors using model predictive control.

In further features, the second control module is configured to determine the second rear torque request for the one or more rear electric motors using non-linear model predictive control.

In further features: the first control module is configured to: determine a front vertical force request for the one or more front suspension actuators of the vehicle based on the front wheel road profile; and control one or more damping characteristics the one or more front suspension actuators based on the front vertical force request; and the second control module is configured to: determine a rear vertical force request for the one or more rear suspension actuators of the vehicle based on the rear wheel road profile; and control one or more damping characteristics of the one or more rear suspension actuators based on the rear vertical force request.

In further features, the first control module is configured to determine the second front vertical force request for the one or more front suspension actuators using model predictive control.

In further features, the first control module is configured to determine the front vertical force request for the one or more front suspension actuators using non-linear model predictive control.

In further features, the second control module is configured to determine the rear vertical force request for the one or more rear suspension actuators using model predictive control.

In further features, the second control module is configured to determine the second rear vertical force request for the one or more rear suspension actuators using non-linear model predictive control.

In a feature, a oscillation control method for a vehicle includes: determining a first front torque request for one or more front electric motors of the vehicle; determining a first rear torque request for one or more rear electric motors of the vehicle; determining a second front torque request for the one or more front electric motors of the vehicle based on the first front torque request and a front wheel road profile;

controlling power flow to the one or more front electric motors based on the second front torque request; determining a second rear torque request for the one or more rear electric motors of the vehicle based on the first rear torque request and a rear wheel road profile; and controlling power flow to the one or more rear electric motors based on the second rear torque request.

In further features, determining the second front torque request includes determining the second front torque request for the one or more front electric motors using model predictive control.

In further features, determining the second front torque request includes determining the second front torque request for the one or more front electric motors using non-linear model predictive control.

In further features, the determining the second rear torque request includes determining the second rear torque request for the one or more rear electric motors using model predictive control.

In further features, determining the second rear torque request includes determining the second rear torque request for the one or more rear electric motors using non-linear model predictive control.

In further features, the oscillation control method of claim 11 further includes: determining a front vertical force request for the one or more front suspension actuators of the vehicle based on the front wheel road profile; controlling one or more damping characteristics the one or more front suspension actuators based on the front vertical force request; determining a rear vertical force request for the one or more rear suspension actuators of the vehicle based on the rear wheel road profile; and controlling one or more damping characteristics of the one or more rear suspension actuators based on the rear vertical force request.

In further features, determining the second front vertical force request includes determining the second front vertical force request for the one or more front suspension actuators using model predictive control.

In further features, determining the front vertical force request includes determining the front vertical force request for the one or more front suspension actuators using non-linear model predictive control.

In further features, determining the rear vertical force request includes determining the rear vertical force request for the one or more rear suspension actuators using model predictive control.

In further features, determining the second rear vertical force request includes determining the second rear vertical force request for the one or more rear suspension actuators using non-linear model predictive control.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The present application involves a nonlinear model predictive control (NMPC) module formulation for the management of the vehicle powertrains. The NMPC module evaluates and minimizes a cost function along a prediction horizon and is configured to do so based on an expected road profile along the prediction horizon. The presence of the road preview information facilitates the generation of an effective control action by the NMPC module, even in presence of typical actuation dynamics.

Figure 1:
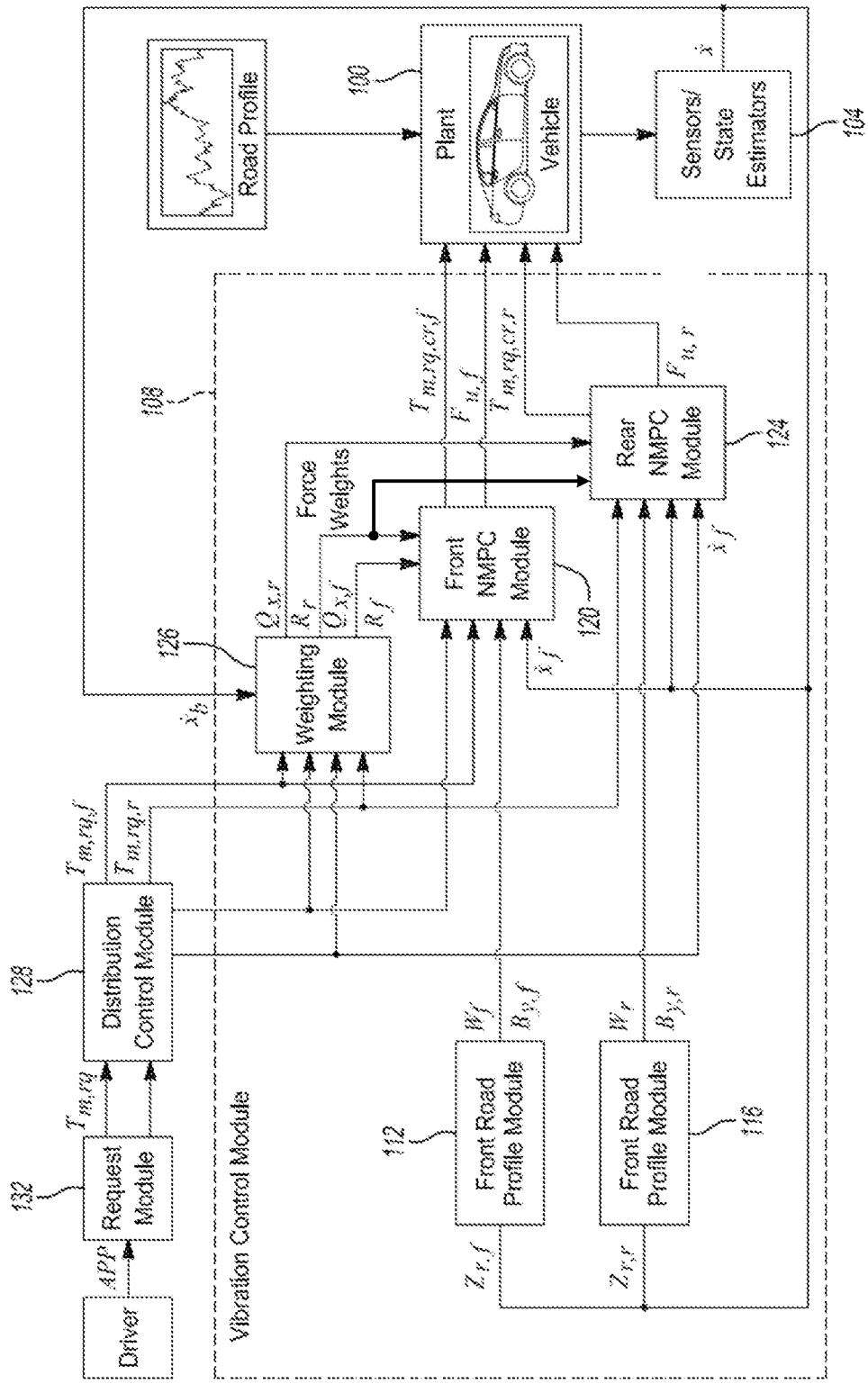
FIG. 1 is a functional block diagram of an example control system.

FIG. 1 includes a functional block diagram of an example control system of a vehicle 100. The vehicle 100 may include two pairs of nonlinear model predictive control (NMPC) modules, one pair per each axle of the vehicle 100 in the example of an electric vehicle with four in-wheel powertrains. The present application, however, is applicable to other numbers of NMPC modules, such as a single NMPC module for a single-axle powertrain; two NMPC modules for a powertrain including one motor for each of two axles; three NMPC modules for a powertrain configuration with two motors on one axle and a single motor on the other axle; and four NMPCs for electric vehicles with one motor per wheel. Moreover, the formulations of the following sections refer to the example of in-wheel powertrains. However, with the inclusion of torsional drivetrain dynamics in the prediction model can be extended to the example of non-in-wheel examples (e.g., on-board) powertrains.

Road preview sensors are available for production vehicle implementations. Alternatively, road preview information (indicative of a profile of a road in front of the vehicle) can be generated or obtained for example: a) via a state estimator module 104 based on measurements of the front suspension dynamics; b) via a lead vehicle preview, using a vehicle in front of the vehicle 100 as a sensor and communicated to the vehicle 100 wirelessly (e.g., via vehicle to vehicle communication); or c) via a remote data source from databases of road profile stored by location. If the road preview information is available only for control of rear powertrains, compensation of the effect of the road irregularities on the front axle may be carried out through a feedback portion of the NMPC module, such as through a reactive contribution without road preview.

Sensor systems can measure the actual road profile as the vehicle 100 moves over the road. However, the road profile over which each tire rolls may contain spectral components with relatively short wavelengths. Filtering (e.g., geometric) of the measured road profile may be performed by a longitudinal vibration control module 108 to describe the tire enveloping behavior. The tire enveloping behavior may comprehend the capability of the tire to deform when rolling over road irregularities. The filtered road profile may be referred to as an effective road profile herein.

A front road profile module 112 includes an enveloping model and generates front wheel data based on the road profile in front of the vehicle using the enveloping model. Similarly, a rear road profile module 116 includes an enveloping model and generates rear wheel data based on the road profile in front of the wheel using the enveloping model. The enveloping models may be, for example, a tandem enveloping model with elliptical cams or another suitable enveloping model. The tandem enveloping model with elliptical cams may be accurate and have minimal computational effort relative to other tire enveloping models. However, other tire enveloping models may be used. The output of the front and rear road profile modules 112 and 116 is the effective road profile at the front and rear tires, which may be defined by the effective road height at the wheel center (w) and effective forward slope (βy).

Figure 2:
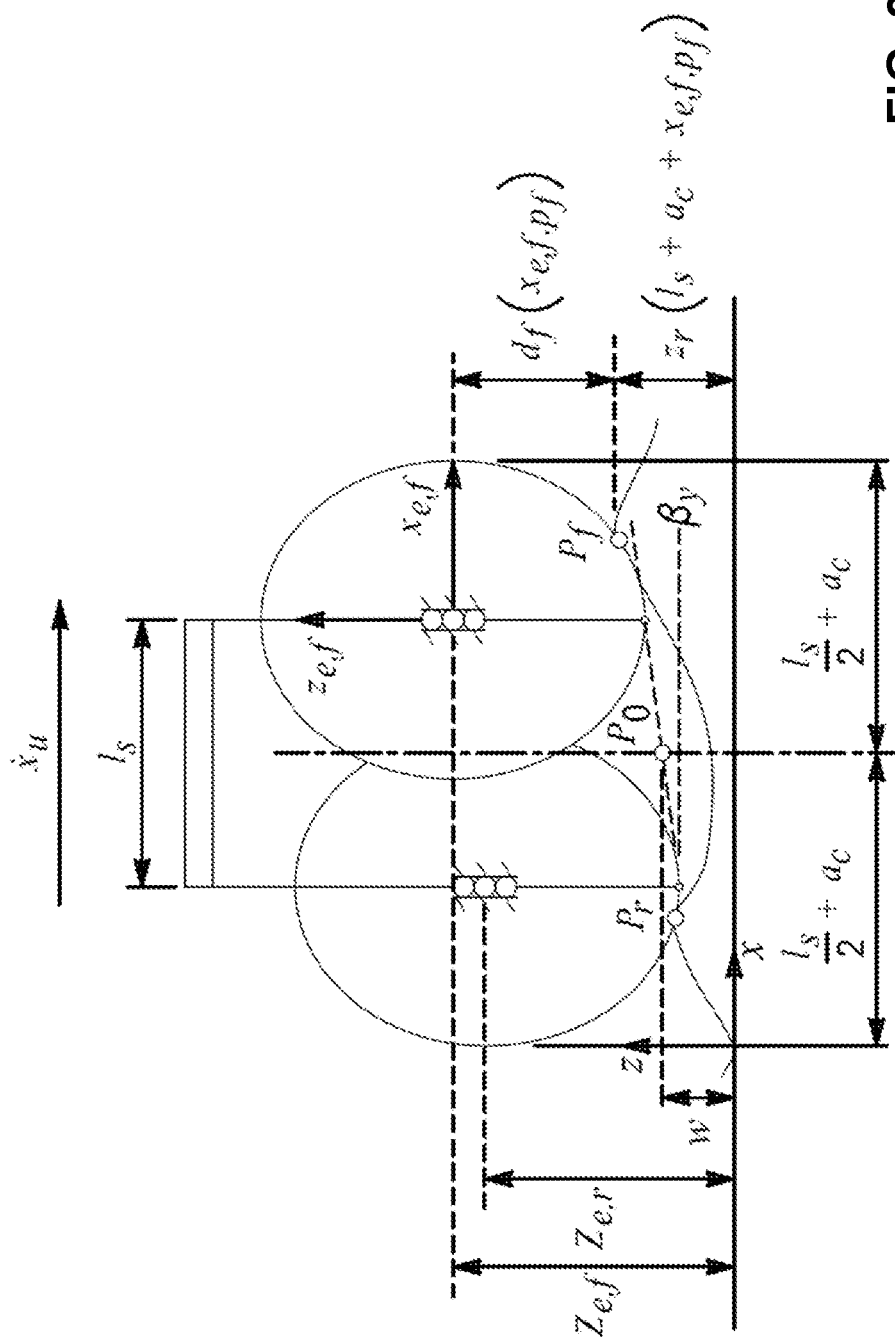
FIG. 2 is a diagram depicting a vehicle including wheels moving over a road.

FIG. 2 includes an example illustration of the enveloping model with elliptical cams. The enveloping model includes two (e.g., identical) rigid ellipses connected by their lowest points with a constant horizontal length equal to $l_{s1}$ i.e., the shift, and moving over the road with the wheel as illustrated in FIG. 2. The ellipses can move independently from each other in the vertical direction, but they are constrained to move together in the longitudinal direction, and rotations are not permitted. The effective road profile is calculated by the front and rear road profile modules 112 and 116 at the midpoint (Po in FIG. 2), which is at the same longitudinal coordinate as the wheel center. FIG. 2, depicts a two-cam tandem configuration used to characterize the enveloping properties of the tire and generate the effective road profile. The envelope model may be used to generate the effective road profile for the front wheels and the effective road profile for the rear wheels.

The front and rear road profile modules 112 and 116 may determine the effective road height and slope using equations (1) and (2), respectively. These equations may be obtained from the geometric relation between the vertical position of the front ($Z_{e,f}$) and rear ellipses ($Z_{e,r}$).

$$w(x_u) = \frac{Z_{e,f} + Z_{e,r}}{2} - b_c \quad (1)$$

$$\tan \beta_y(x_u) = \frac{Z_{e,f} - Z_{e,r}}{l_s} \quad (2)$$

where $a_c$ and $b_c$ are the minor and major ellipse semi-axes, respectively. The local axes are $x_{e,f}$ and $z_{e,f}$ in the front ellipse, and $x_{e,r}$ and $z_{e,r}$ in the rear ellipse.

The ellipses vertical position is determined, such as based on considering that the ellipses are rigid. Mathematically, $Z_{e,f}$ and $Z_{e,r}$ may be calculated (e.g., by the front and rear road profile modules 112 and 116 or vertical position modules, respectively) based on the maximum of a sum of the road height $z_r$ (·) and a distance between the local longitudinal ellipse axis and the ellipse bottom boundary ($d_f(x_{e,f})$ and $d_r(x_{e,r})$ for the front and rear ellipses). For example, for the front ellipse, the distance may follow the ellipse equation:

$$\left[\frac{x_{e,f}}{a_c}\right]^c + \left[\frac{z_{e,f}}{b_c}\right]^c = 1 \quad (3)$$

$$d_f(x_{e,f}) = \left|b_c\left[1 - \left[\frac{|x_{e,f}|}{a_c}\right]^c\right]^{\frac{1}{c}}\right|$$

where c is the ellipse shape parameter.

$Z_{e,f}$ and $Z_{e,r}$ can be calculated with equations (4) and (5):

$$Z_{e,f}=\max[z_r(x_u,x_{e,f})+d_f(x_{e,f})]x_{e,f}\Sigma[-a_c,a_c] \quad (4)$$

$$Z_{e,r}=\max[z_r(x_u,x_{e,r})+d_r(x_{e,r})]x_{e,r}\Sigma[-a_c,a_c] \quad (5)$$

Figure 4:
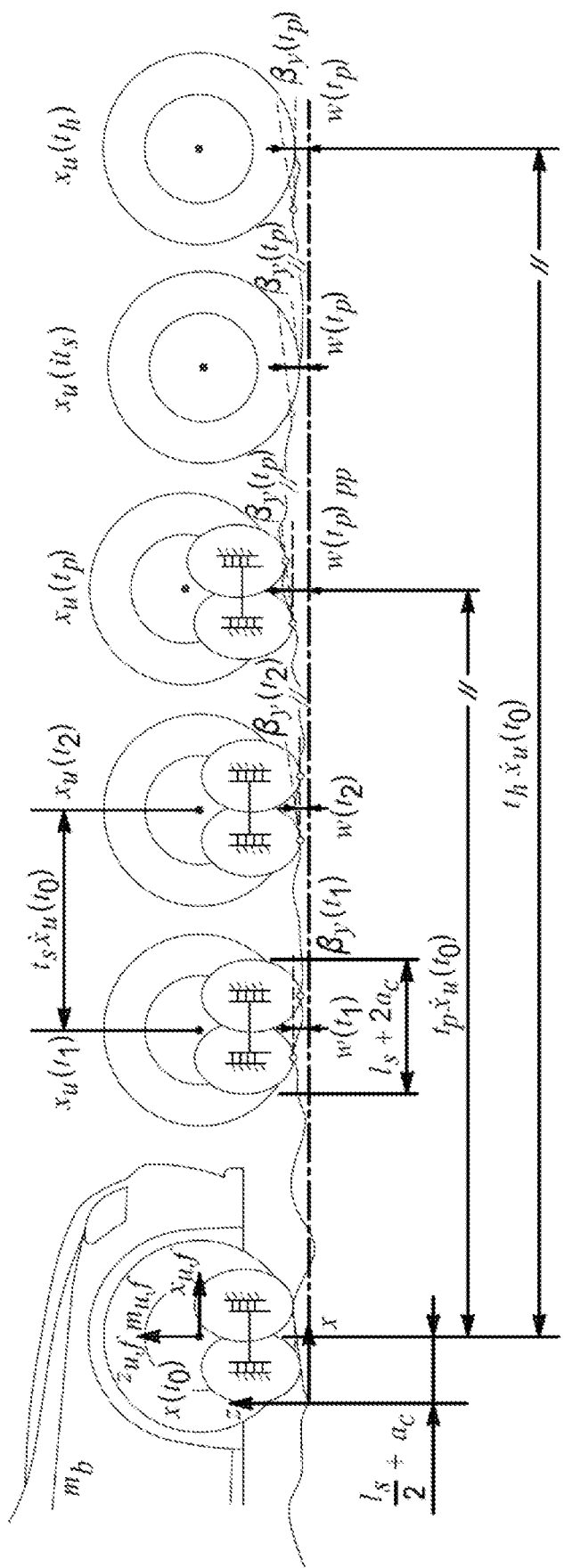
FIG. 4 is a diagram depicting data obtained from a measured road profile.

The road height is a function of the position of the wheel and the position of each ellipse along the local axis. This calculation is carried out for each longitudinal wheel position $x_u$, such as illustrated in FIG. 4.

The effective front and rear wheel road profiles are determined by the front and rear road profile modules 112 and 116 and input to front and rear NMPC modules 120 and 124, respectively.

The front and rear NMPC modules 120 and 124 determine front and rear wheel torques based on the effective front and rear wheel road profiles and other parameters using a corner model. The corner model considers the dynamics of a single wheel as well as the related sprung and unsprung masses. The following will describe an example of the corner model for a front corner/front wheel. Similar applies to a rear corner/rear wheel.

The corner model includes the enveloping properties of the tire and the effect of the vertical and longitudinal suspension compliances. The vertical dynamics may be for a quarter vehicle, while the longitudinal dynamics may be for either for the half vehicle or the full vehicle, such as depending on the powertrain configuration and control implementation. In the following, all of the presented equations are provided for the longitudinal dynamics of a half vehicle.

Figure 3:
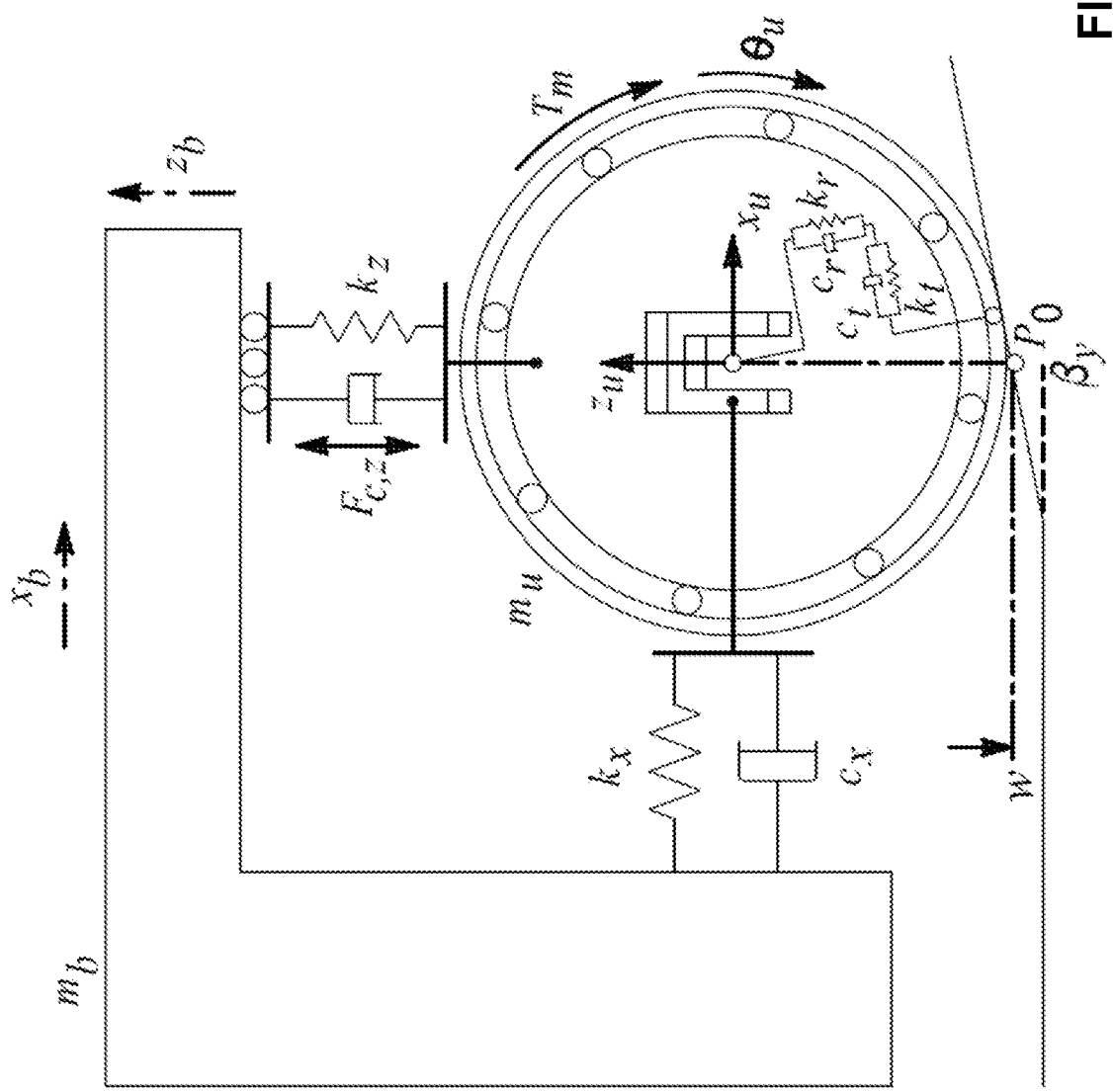
FIG. 3 is a diagram depicting a scheme of a quarter vehicle model.

In FIG. 3, an illustration for a corner mode) is presented. For modeling the tire dynamics, the model includes two spring-damper systems, one radial spring-damper system and a second tangential spring-damper system. Springs and dampers are used to model the longitudinal and vertical compliances of the suspension system. The vertical compliance is related to the physical springs and dampers of the suspension system, while the longitudinal compliance may account for the effect of the suspension bushings, which may be modelled through equivalent stiffness and damping elements.

The model of the front and rear NMPC modules 120 and 124 may be expressed in the form of continuous differential equations, such as:

$$\dot{x}(t)=f(x(t),u(t),p(t)) \quad (6)$$

where, for an in-wheel powertrain configuration, the state vector x for a considered front corner may be:

$$x=[\dot{z}_{b,f},\dot{z}_{u,f},\dot{x}_{b,f},\dot{x}_{u,f},\omega_f,\sigma_{d,f},T_{m,f}]^T \quad (7)$$

where $\dot{z}_{b,f}$ is a vertical speed of the body (vehicle) at the considered front corner; $\dot{z}_{u,f}$ is the vertical speed of the unsprung mass; $\dot{x}_{b,f}$ is the longitudinal speed of the front part of the vehicle body; $\dot{x}_{u,f}$ is the longitudinal speed of the unsprung mass; $\omega_f$ is the rotational wheel speed; $\sigma_{d,f}$ is the delayed longitudinal slip; and $T_{m,f}$ is the motor torque at the wheel of a direct drive layout of the in-wheel powertrain and symmetric torque demand on the two wheels on the same axle. The equations may be generalized to the case of asymmetric torque values.

The external inputs to the front and rear NMPC modules 120 and 124 regarding torque correction may be introduced as a matrix p:

$$p = \begin{bmatrix} w_{f,i} & w_{f,i+1} & \cdots & w_{f,N_h} \\ \beta_{y,f,i} & \beta_{y,f,i+1} & \cdots & \beta_{y,f,N_h} \\ T_{m,rq,f} & T_{m,rq,f} & \cdots & T_{m,rq,f} \\ T_{m,rq,r} & T_{m,rq,r} & \cdots & T_{m,rq,r} \end{bmatrix}^T \quad (7)$$

where the first and second row are named $W_f$ and $B_{y,f}$, respectively. They represent the effective road height and slope along the prediction horizon including $N_h$ time steps into the future. $T_{m,rq,f}$ and $T_{m,rq,r}$ are, respectively, requested torques (before correction by the front and rear NMPC modules 120 and 124) at the front and rear wheels.

The model dynamics of the models of the front and rear NMPC modules 120 and 124 may be described by the following equations (also see Table I below for descriptions, symbols, and example units):

$$\ddot{z}_{b,f} = (-F_{c,z,f} - F_{k,z,f})\frac{a+b}{m_b b} \tag{8}$$

$$\ddot{z}_{u,f} = (F_{c,z,f} + F_{k,z,f} + F_{r,z,f} - F_{t,z,f} + F_{x,z,f})\frac{1}{m_{u,f}} \tag{9}$$

$$\ddot{x}_{b,f} = \left(-F_{c,x,f} - F_{k,x,f} + \frac{T_{m,rq,r}}{R_{r,laden}} - \frac{F_{drag}}{2} - \frac{F_{rr,r}}{2}\right)\frac{1}{m_b + m_{u,r} + \frac{I_{y,r}}{R_r^2}} \tag{10}$$

$$\ddot{x}_{u,f} = (F_{c,x,f} + F_{k,x,f} - F_{r,x,f} - F_{t,x,f} + F_{x,x,f})\frac{1}{m_{u,f}} \tag{11}$$

$$\dot{\omega}_f = (T_{m,f} - F_{x,f}R_{f,laden} - M_{y,f})\frac{1}{I_{y,f}} \tag{12}$$

$$\dot{\sigma}_{d,f} = (\sigma_{th,f} - \sigma_{d,f})\frac{\dot{x}_u}{L_{rel}} \tag{13}$$

$$\dot{T}_{m,f} = (T_{m,rq,cr,f} - T_{m,f})\frac{1}{\tau} \tag{14}$$

TABLE I

Nomenclature

| Parameter | Symbol | Unit |
|---|---|---|
| Total vehicle mass | $m_{tot}$ | kg |
| Half sprung mass | $m_b$ | kg |
| Front/rear unsprung mass of individual corners | $m_{u,f/r}$ | kg |
| Front semi-wheelbase | a | m |
| Rear semi-wheelbase | b | m |
| Centre of gravity height | $h_g$ | m |
| Longitudinal suspension stiffness | $k_{x,f/r}$ | N/m |
| Vertical suspension stiffness | $k_{z,f/r}$ | N/m |
| Longitudinal suspension damping coefficient | $c_{x,f/r}$ | Ns/m |
| Wheel radius | $R_{f/r}$ | m |
| Drag coefficient | $C_d$ | — |
| Frontal area | $A_{car}$ | m² |
| Air density | $\rho_{air}$ | kg/m³ |
| Front/rear wheel inertia | $I_{y,f/r}$ | kg · m² |
| Relaxation length | $L_{rel}$ | m |

The aerodynamic drag force on the vehicle, $F_{drag}$, if considered relevant to the specific application, may be calculated using the equation:

$$F_{drag} = \frac{1}{2}\rho_{air}C_d A_{car}\dot{x}_b^2 \tag{15}$$

The rolling resistance of the rear axle, $F_{rr,r}$, may be modeled by using the rolling resistance coefficient $f_r$, e.g., calculated using the equation:

$$f_r = f_0 + f_2\dot{x}_{b,2} \tag{16}$$

$$F_{rr,r} = f_r m_{tot}\frac{a}{a+b}g \tag{17}$$

where $\sigma_{th}$ represents a predetermined theorical slip for a traction scenario and can be calculated using the equation:

$$\sigma_{th,f} = 1 - \frac{\dot{x}_u}{\omega_f R_f} \tag{18}$$

The Pacejka Magic Formula for pure longitudinal slip may be used to determine the longitudinal tire force $F_x$. Alternative longitudinal tire force formulations can be adopted, e.g., based on a tire brush model or polynomial formulations. This force is divided in the longitudinal and vertical components, $F_{x,x}$ and $F_{x,z}$, based on the effective slope of the road. The rolling resistance moment, $M_y$, may also be calculated with the Pacejka Magic Formula or another suitable formulation. $R_{f/r,laden}$ is the laden radius of the tire.

The vertical and longitudinal suspension compliance forces may be described by the equations:

$$F_{k,z,f} = k_{z,f}(z_{b,f} - z_{u,f}) \tag{19}$$

$$F_{k,x,f} = k_{x,f}(x_{b,f} - x_{u,f}) \tag{20}$$

$$F_{c,x,f} = c_{x,f}(\dot{x}_{b,f} - \dot{x}_{u,f}) \tag{21}$$

The vertical damping force $F_{c,z}$ may be calculated with a continuous nonlinear function that approximates passive damper behavior, or from a reference suspension actuator force if the plant includes a controllable suspension actuator.

The forces caused by the road profile are defined by the radial and tangential spring-damper pairs in FIG. 3. The radial force $F_{r,f}$ may be calculated using the equation:

$$F_{r,f} = (w_f - z_{u,f})\cos\beta_{y,f}k_{r,f} + (\dot{w}_f - \dot{z}_{u,f})\cos\beta_{y,f}c_{r,f} \tag{22}$$

Equation 23 may exclude the time derivative of the effective road slope. Similarly, the tangential force $F_{t,f}$ may be determined using the equation:

$$F_{t,f} = (w_f - z_{u,f})\sin\beta_{y,f}k_{t,f} + (\dot{w}_f - \dot{z}_{u,f})\sin\beta_{y,f}c_{t,f} \tag{23}$$

where $k_{r,f}$ and $c_{r,f}$ are the radial stiffness and damping coefficients of the tire, and $k_t$ and $c_t$ are the tangential stiffness and damping coefficient of the tire. Both the radial and tangential forces may be decomposed into vertical and longitudinal components.

$T_{m,rq,cr}$ is the (corrected) requested torque to the motors corrected by the front and rear NMPC modules 120 and 124 (f being for the front axle motor(s) and r being for the rear axle motor(s)). The front and rear NMPC modules 120 and 124, using NMPC, determine the front and rear corrected torque requests for the front and rear motors based on (a) the front and rear effective road profiles, respectively, (b) initial front and rear torque requests ($T_{m,rq}$), respectively, and (c) front and rear torque weights ($Q_{x,f}$, $Q_{x,f}$), respectively, using one or more equations and/or lookup tables that relate road profiles, initial torque requests, and weights to corrected torque requests. The front NMPC module 120 controls power flow to the front motor(s) based on the front corrected torque request. The rear NMPC module 124 controls power flow to the rear motor(s) based on the front corrected torque request.

Based on a total motor torque request ($T_{m,rq}$) a distribution control module 128 determines the front and rear torque requests ($T_{m,rq,f}$ and $T_{m,rq,r}$). The distribution control module 128 determines how much of the total motor torque request should be provided via the rear wheels and how much of the total motor torque request should be provided via the front wheels. For example, the distribution control module 128 may determine a percentage of the total motor torque request that should be provided via the front wheels based on one or more operating conditions, such as using a lookup table that relates operating conditions to percentages. For example, the distribution control module 128 may determine to provide more torque via the front wheels when under a type of cornering condition than the rear wheels. As another example, the distribution control module 128 may determine to provide more torque via the rear wheels when under a type of acceleration condition than the front wheels. The distribution control module 128 may set the front torque request based on or equal to the total motor torque request multiplied by the percentage. The distribution control module 128 may set the rear torque request based on or equal to the total motor torque request multiplied by (100—the percentage).

A request module 132 sets the total motor torque request, for example, based on an accelerator pedal position (APP), such as using a lookup table that relates APPs to total motor torque requests. An APP sensor may generate the APP based on a position of an accelerator pedal that is actuatable by a driver. In the example of an autonomous vehicle, the request module 132 may set the total motor torque request based on an acceleration request or another suitable input.

Referring back to the front and rear NMPC modules 120 and 124, the NMPC modules 120 and 124 generate the front and rear corrected torque requests as discussed above based on the front and rear effective road profiles, respectively. The effective road profiles include effective road height and slope information as discussed above (w and β) along the preview time $t_p$ within the prediction horizon $t_h$. The preview time and prediction horizon may be discretized with the respective number of steps, $N_p$ and $N_h$:

$$t_p = N_p \cdot t_s \quad (24)$$

$$t_h = N_h \cdot t_s \quad (25)$$

where $t_s$ is the sampling time of the front and rear NMPC modules 120 and 124.

FIG. 4 shows how the effective road profile information is obtained from the measured road profile ahead (from the leading wheels), while the enveloping model is used to calculate the effective road profile at each wheel position during the preview time.

Since the prediction horizon may be short, a constant velocity assumption may not significantly affect the results. In various implementations, different assumptions, such as constant acceleration, could be made regarding the velocity profile along the prediction horizon. Then, the wheel position can be described by the equation:

$$x_u(t_i) = \dot{x}_u(t_0) t_s k \quad (26)$$

Herein, the subscript k indicates the time step along the prediction horizon. If the prediction horizon is longer than the preview time, the effective road profile data from the last time preview value may be maintained.

For optimization, the front and rear NMPC modules 120 and 124 may predict and optimize the response of the plant along the prediction horizon to generate the corrected front and rear torque requests. The optimal control action (corrected front and rear torque requests) is achieved by minimizing a cost function accounting for the system dynamics along the prediction horizon, including a set of constraints. Only the first control input (or control move) is applied to the plant, according to the receding horizon approach.

An example cost function J may have the following mathematical structure:

$$J = \frac{1}{2}\left\|Z^{N_h} - Z_{obj}^{N_h}\right\|_{Q_x}^2 + \frac{1}{2}\sum_{k=0}^{N_h-1}\left(\left\|Z^k - Z_{obj}^k\right\|_{Q_x}^2 + \|u^k\|_R^2\right) \quad (27)$$

$$x(0) = x_{in}$$

$$x(k+1) = f(x(k), p(k))$$

$$\underline{u} \leq u(k) \leq \overline{u}$$

$$u(\cdot) : [0, N_h - 1]$$

S. t.

where k represents the discretization step; $\underline{u}$ and $\overline{u}$ the lower and upper limits for the control action u; $Z$ is the the vector of the predicted system outputs, whose corresponding reference vector is $Z_{obj}$; $Q_x$ and R are positive diagonal matrices used for weighting; x(k+1)=f(x(k), p(k)) is the discretized model already presented. Hard and soft constraints, the latter may be referred to a slack variable, may be expressed in terms of states and outputs. Different prediction and control horizons can be set.

Equation (28) includes two terms, the first term aiming to minimize a response error at the end of the prediction horizon, and the second term targeting response improvement along the prediction horizon. $Q_x$ and R are positive diagonal matrices used for weighting. For example, $Z_k$ includes terms related to the longitudinal body acceleration, and the relative longitudinal velocity between the sprung and unsprung masses, and $u^k$ is the motor torque correction:

$$Z^k = [\ddot{x}_{b,k} \dot{X}_{b,k} \dot{x}_{u,k}] \quad (28)$$

$$u^k = [\Delta T_{m,k}] \quad (29)$$

where k is the index that specifies the time step along the prediction horizon. $Z_{obj}^k$ is a reference vector:

$$Z_{obj}^k = [\ddot{x}_{b,ref,k} \; 0]^T \quad (30)$$

For example, $\ddot{x}_{b,ref,k}$ is a reference acceleration at each time step of the prediction horizon, which can be calculated with the following rigid vehicle model equation, however, another suitable calculation may be used:

$$\ddot{x}_{b,ref} = \frac{\frac{2T_{m,rq,f}}{R_f} + \frac{2T_{m,rq,r}}{R_r} - (f_0 + f_2 \dot{x}_b^2) m_{tot} g - \frac{1}{2}\rho_{air} c_D A \dot{x}_b^2}{m_{tot} + \frac{2I_{y,r}}{R_r^2} + \frac{2I_{y,f}}{R_f^2}} \quad (31)$$

The lower and upper constraints in the control action may be set based on limitations of the front and rear motors to produce torque, such as:

$$Lb_{T_m} \leq T_{m,req} + \Delta T_m \leq Ub_{T_m} \quad (32)$$

where $Lb_{T_m}$ and $Ub_{T_m}$ are the lower and upper boundary of the motor torque. The model formulations of the front and rear NMPC modules 120 and 124 as well as the nonlinear optimal control problem can be adapted to different powertrain layouts, as discussed above.

A weighting module 126 determines the cost function weights for the output(s) and control action(s) of the front and rear NMPC modules 120 and 124. These weights (values) can be based on the front and rear torque requests, system states, and road profiles. The weighting module 126 may determine the cost function weights, for example, using an equation or a lookup table function of the torque requests, system states, and road profiles.

Figure 5:
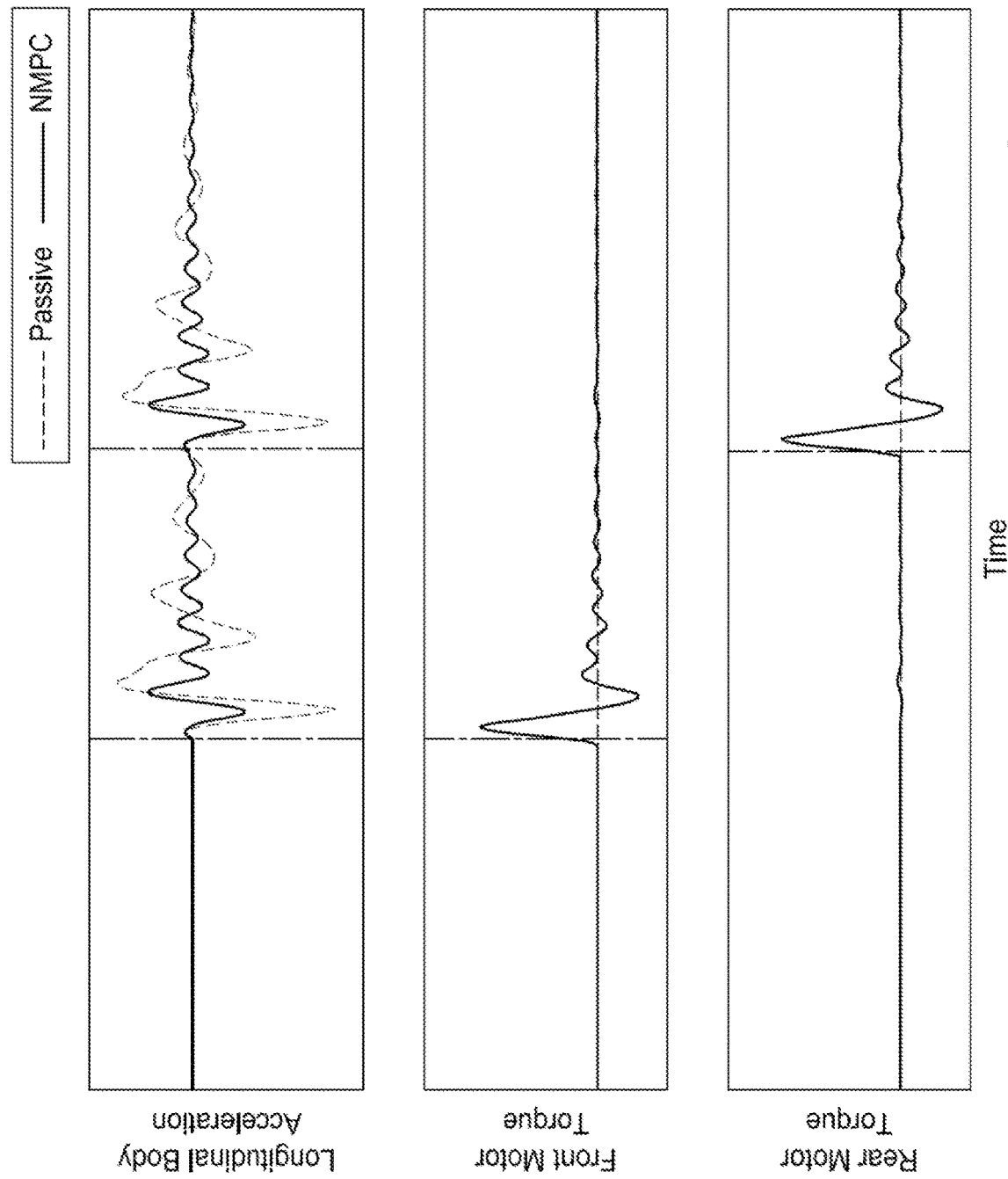
FIG. 5 includes example graphs illustrating benefits of a road-preview-augmented controller during a positive road profile step test.

FIG. 5 includes example graphs illustrating a benefit of the control discussed herein based on the road profile information with respect to a passive vehicle during a positive step test in terms of road profile, for a vehicle with four in-wheel motors, with a constant total motor torque request. The subplots illustrate longitudinal acceleration profiles of the two vehicles, as well as the front and rear motor torque profiles, after the corrections imposed by the front and rear NMPC modules 120 and 124 as discussed above. The front and rear NMPC modules 120 and 124 act pre-emptively with respect to the road step input to attenuate the system dynamics. As a result, the control discussed herein provides a significant reduction of the longitudinal acceleration oscillations, as illustrated by the smaller magnitudes oscillation of the solid line in the top graph.

An additional or alternative solution includes introducing control on the vertical force of the suspension actuator $F_u$ by the front and rear NMPC modules 120 and 124. This solution can be integrated with the motor torque control to additionally compensate for vertical oscillations induced by road irregularities. The cost function can be adapted with additional outputs (e.g., vertical body acceleration deviation) and control actions (e.g., the vertical actuator force).

Figure 6:
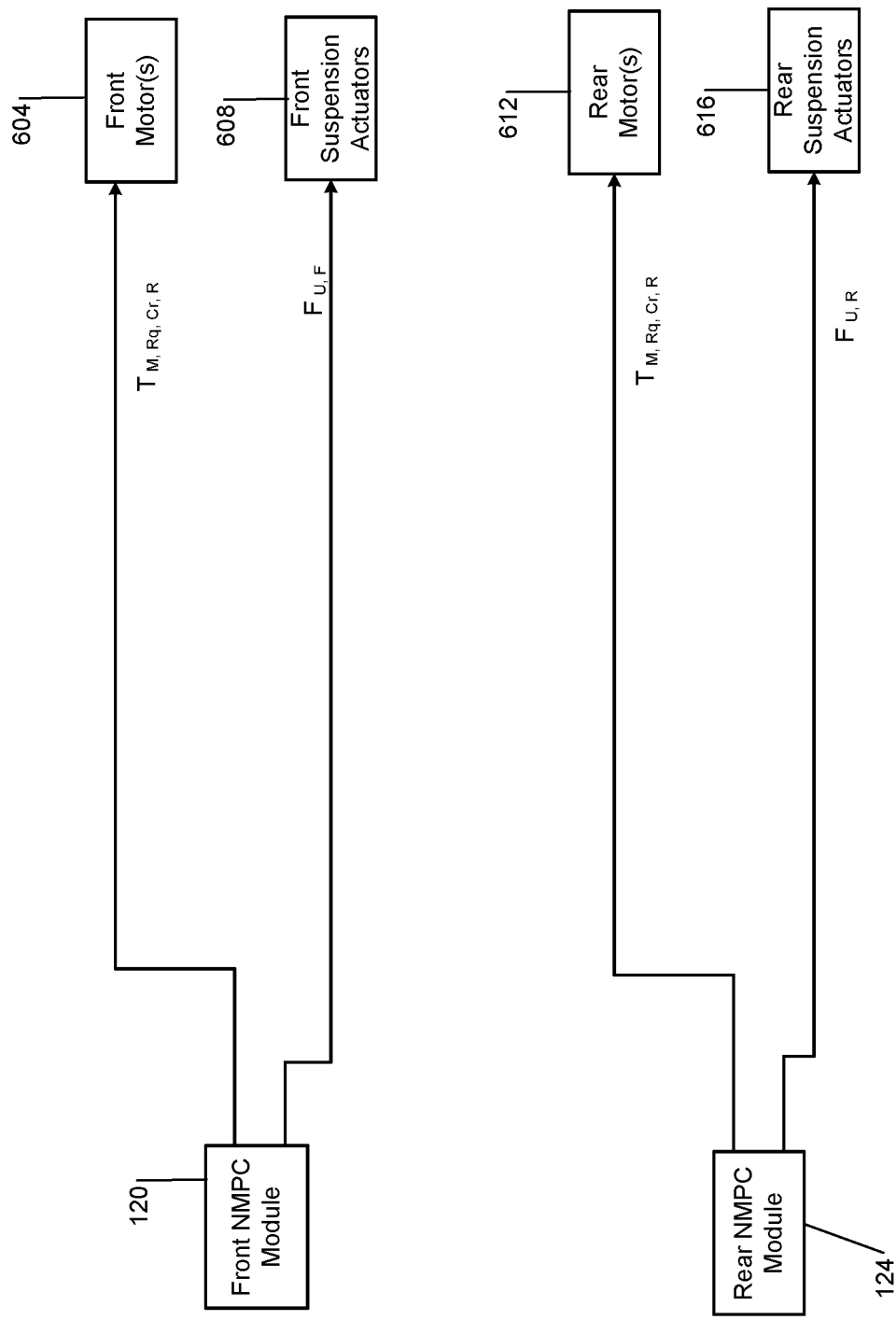
FIG. 6 is a functional block diagram of an example control system for controlling the motor torques and the suspension actuators of the vehicle.

FIG. 6 is a functional block diagram of an example control system. As discussed above, the front NMPC module 120 controls application of electrical power to the front motor(s) 604. The front NMPC module 120 also controls one or more characteristics (e.g., reference force or stiffness) of the front suspension actuators (e.g., electromagnetic dampers, hydraulic dampers, etc.) 608 at the front corners of the vehicle.

The rear NMPC module 124 controls application of electrical power to the rear motor(s) 612. The rear NMPC module 124 also controls one or more characteristics (e.g., reference force or stiffness) of the rear suspension actuators (e.g., electromagnetic dampers, hydraulic dampers, etc.) 616 at the rear corners of the vehicle.

Figure 7:
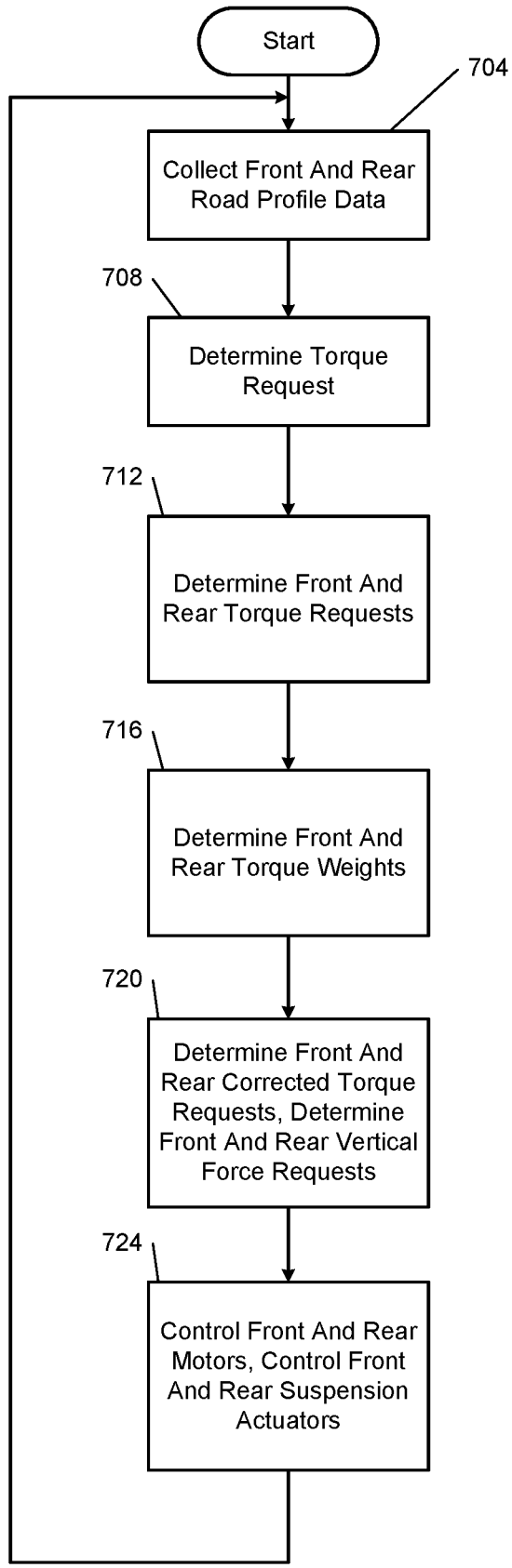
FIG. 7 is a flowchart depicting an example method of controlling the motor torques and the suspension actuators of the vehicle.

FIG. 7 is a flowchart depicting an example method of controlling the motors and the suspension actuators of the vehicle as described above. Control begins with 704 where the front and rear road profile modules 112 and 116 collect data from the state sensors/estimator 104 and/or the sensed road profile to determine the front and rear road profiles.

At 708, the request module 132 determines the total motor torque request. At 712, the distribution control module 128 determines the (initial) front and rear torque requests based on the total motor torque request and the percentage. At 716, the weighting module 126 determines the front and rear torque weights for the cost function.

At 720, the front NMPC module 120 determines the corrected front motor torque request based on the front torque request and determines the front vertical force. Also, the rear NMPC module 124 determines the corrected rear motor torque request based on the rear torque request and determines the rear vertical force.

At 724, the front NMPC module 120 controls power flow to the front motor(s) based on the corrected front motor torque request and actuates the front suspension actuators based on the front vertical force. Also, the rear NMPC module 124 controls power flow to the rear motor(s) based on the corrected rear motor torque request and actuates the rear suspension actuators based on the rear vertical force.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An oscillation control system of a vehicle, comprising:
a distribution control module configured to determine:
   a first front torque request for one or more front electric motors of the vehicle; and
   a first rear torque request for one or more rear electric motors of the vehicle;
a first control module configured to:
   determine a second front torque request for the one or more front electric motors of the vehicle based on the first front torque request and a front wheel road profile; and
   control power flow to the one or more front electric motors based on the second front torque request;
a second control module configured to:
   determine a second rear torque request for the one or more rear electric motors of the vehicle based on the first rear torque request and a rear wheel road profile; and
   control power flow to the one or more rear electric motors based on the second rear torque request.

2. The oscillation control system of claim 1 wherein the first control module is configured to determine the second front torque request for the one or more front electric motors using model predictive control.

3. The oscillation control system of claim 1 wherein the first control module is configured to determine the second front torque request for the one or more front electric motors using non-linear model predictive control.

4. The oscillation control system of claim 1 wherein the second control module is configured to determine the second rear torque request for the one or more rear electric motors using model predictive control.

5. The oscillation control system of claim 1 wherein the second control module is configured to determine the second rear torque request for the one or more rear electric motors using non-linear model predictive control.

6. The oscillation control system of claim 1 wherein:
the first control module is configured to:
   determine a front vertical force request for the one or more front suspension actuators of the vehicle based on the front wheel road profile; and
   control one or more damping characteristics the one or more front suspension actuators based on the front vertical force request; and
the second control module is configured to:
   determine a rear vertical force request for the one or more rear suspension actuators of the vehicle based on the rear wheel road profile; and
   control one or more damping characteristics of the one or more rear suspension actuators based on the rear vertical force request.

7. The oscillation control system of claim 6 wherein the first control module is configured to determine the second front vertical force request for the one or more front suspension actuators using model predictive control.

8. The oscillation control system of claim 7 wherein the first control module is configured to determine the front vertical force request for the one or more front suspension actuators using non-linear model predictive control.

9. The oscillation control system of claim 7 wherein the second control module is configured to determine the rear vertical force request for the one or more rear suspension actuators using model predictive control.

10. The oscillation control system of claim 7 wherein the second control module is configured to determine the second rear vertical force request for the one or more rear suspension actuators using non-linear model predictive control.

11. An oscillation control method for a vehicle, comprising:
   determining a first front torque request for one or more front electric motors of the vehicle;
   determining a first rear torque request for one or more rear electric motors of the vehicle;
   determining a second front torque request for the one or more front electric motors of the vehicle based on the first front torque request and a front wheel road profile;
   controlling power flow to the one or more front electric motors based on the second front torque request;
   determining a second rear torque request for the one or more rear electric motors of the vehicle based on the first rear torque request and a rear wheel road profile; and
   controlling power flow to the one or more rear electric motors based on the second rear torque request.

12. The oscillation control method of claim 11 wherein determining the second front torque request includes determining the second front torque request for the one or more front electric motors using model predictive control.

13. The oscillation control method of claim 11 wherein determining the second front torque request includes determining the second front torque request for the one or more front electric motors using non-linear model predictive control.

14. The oscillation control method of claim 11 wherein the determining the second rear torque request includes determining the second rear torque request for the one or more rear electric motors using model predictive control.

15. The oscillation control method of claim 11 wherein determining the second rear torque request includes determining the second rear torque request for the one or more rear electric motors using non-linear model predictive control.

16. The oscillation control method of claim 11 further comprising:
   determining a front vertical force request for the one or more front suspension actuators of the vehicle based on the front wheel road profile;
   controlling one or more damping characteristics the one or more front suspension actuators based on the front vertical force request;
   determining a rear vertical force request for the one or more rear suspension actuators of the vehicle based on the rear wheel road profile; and
   controlling one or more damping characteristics of the one or more rear suspension actuators based on the rear vertical force request.

17. The oscillation control method of claim 16 wherein determining the second front vertical force request includes determining the second front vertical force request for the one or more front suspension actuators using model predictive control.

18. The oscillation control method of claim 17 wherein determining the front vertical force request includes determining the front vertical force request for the one or more front suspension actuators using non-linear model predictive control.

19. The oscillation control method of claim 17 wherein determining the rear vertical force request includes determining the rear vertical force request for the one or more rear suspension actuators using model predictive control.

20. The oscillation control method of claim 17 wherein determining the second rear vertical force request includes determining the second rear vertical force request for the one or more rear suspension actuators using non-linear model predictive control.

* * * * *